(12) United States Patent
Takemoto

(10) Patent No.: US 12,434,490 B2
(45) Date of Patent: *Oct. 7, 2025

(54) RECORDING METHOD

(71) Applicant: SEIKO EPSON CORPORATION, Tokyo (JP)

(72) Inventor: Kiyohiko Takemoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 105 days.

This patent is subject to a terminal disclaimer.

(21) Appl. No.: 18/481,816

(22) Filed: Oct. 5, 2023

(65) Prior Publication Data

US 2024/0025189 A1    Jan. 25, 2024

Related U.S. Application Data

(63) Continuation of application No. 17/222,689, filed on Apr. 5, 2021, now Pat. No. 11,806,989, which is a (Continued)

(30) Foreign Application Priority Data

Sep. 11, 2009  (JP) .................................. 2009-210177

(51) Int. Cl.
  *B41J 11/00*    (2006.01)
  *B41J 2/01*     (2006.01)
  (Continued)

(52) U.S. Cl.
  CPC .............. *B41J 11/0022* (2021.01); *B41J 2/01* (2013.01); *B41J 2/2107* (2013.01); (Continued)

(58) Field of Classification Search
  CPC ... B41J 2/01; B41J 2/211; B41J 2/1433; B41J 2/17; B41J 2/17593; B41J 2/2107; (Continued)

(56) References Cited

U.S. PATENT DOCUMENTS 5,479,199 A   12/1995   Moore et al.
5,764,262 A   6/1998    Wu et al.
(Continued)

FOREIGN PATENT DOCUMENTS

JP   S56-028256   3/1981
JP   S62-001426   1/1987
(Continued)

OTHER PUBLICATIONS

Ohta et al., "Geljet Printer IPSiO G707/G505 Technical Report", published Dec. 2004.
(Continued)

*Primary Examiner* — Manish S Shah
(74) *Attorney, Agent, or Firm* — WORKMAN NYDEGGER

(57) ABSTRACT

A recording method includes a first drying step of evaporating 50 to 85 wt % of ink adhering on a recording medium, the ink being ejected from a recording head onto a surface of the recording medium back side of which is supported on a medium-supporting unit which faces the recording head, and a second drying step of drying the recording medium, which has been subjected to the first drying step, at the downstream side of the medium-supporting unit in a feeding direction of the recording medium.

22 Claims, 6 Drawing Sheets

Related U.S. Application Data continuation of application No. 16/407,582, filed on May 9, 2019, now Pat. No. 10,974,524, which is a continuation of application No. 15/342,681, filed on Nov. 3, 2016, now Pat. No. 10,328,720, which is a continuation of application No. 14/886,965, filed on Oct. 19, 2015, now Pat. No. 9,522,549, which is a continuation of application No. 14/022,072, filed on Sep. 9, 2013, now Pat. No. 9,193,178, which is a continuation of application No. 12/879,555, filed on Sep. 10, 2010, now Pat. No. 8,550,614.

(51) Int. Cl.
*B41J 2/21* (2006.01)
*B41M 7/00* (2006.01)

(52) U.S. Cl.
CPC .......... *B41J 11/0015* (2013.01); *B41J 11/002* (2013.01); *B41J 11/0024* (2021.01); *B41M 7/00* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 6,086,197 | A | 7/2000 | Kubota et al. |
| 6,302,536 | B1 | 10/2001 | Sarma et al. |
| 6,524,383 | B2 | 2/2003 | Komatsu et al. |
| 7,677,715 | B2 | 3/2010 | Uji et al. |
| 7,919,544 | B2 | 4/2011 | Matsuyama et al. |
| 8,550,614 | B2 | 10/2013 | Takemoto |
| 9,193,178 | B2 | 11/2015 | Takemoto |
| 9,522,549 | B2 | 12/2016 | Takemoto |
| 2002/0168210 | A1 | 11/2002 | Verhoest et al. |
| 2003/0184630 | A1 | 10/2003 | Elgee |
| 2004/0061752 | A1 | 4/2004 | Alfekri et al. |
| 2005/0124726 | A1 | 6/2005 | Yatake et al. |
| 2005/0176847 | A1 | 8/2005 | Cagle |
| 2005/0235870 | A1 | 10/2005 | Ishihara |
| 2006/0125897 | A1 | 6/2006 | Choi et al. |
| 2007/0165088 | A1* | 7/2007 | Maeno ............... B41J 2/14209 347/100 |
| 2008/0049086 | A1* | 2/2008 | Rolly ................ C09D 11/322 106/31.89 |
| 2008/0084449 | A1 | 4/2008 | Cai et al. |
| 2008/0138519 | A1 | 6/2008 | Habashi et al. |
| 2008/0152825 | A1 | 6/2008 | Mukai et al. |
| 2008/0152828 | A1 | 6/2008 | Mukai et al. |
| 2009/0027471 | A1 | 1/2009 | Komatsu et al. |
| 2009/0219330 | A1 | 9/2009 | Kiyomoto et al. |
| 2009/0233061 | A1* | 9/2009 | Irita ................ B41M 5/0023 427/261 |
| 2009/0244236 | A1 | 10/2009 | Houjou |
| 2011/0181675 | A1* | 7/2011 | Takemoto .......... B41J 11/00244 347/102 |
| 2011/0200797 | A1 | 8/2011 | Mukai et al. |
| 2011/0200798 | A1 | 8/2011 | Mukai et al. |
| 2011/0200799 | A1 | 8/2011 | Mukai et al. |
| 2013/0101810 | A1 | 4/2013 | Mukai et al. |
| 2013/0182057 | A1 | 7/2013 | Koase |
| 2013/0321511 | A1 | 12/2013 | Toya |
| 2014/0098158 | A1 | 4/2014 | Mukai et al. |
| 2014/0300674 | A1 | 10/2014 | Sasaki et al. |

FOREIGN PATENT DOCUMENTS

| | | | |
|---|---|---|---|
| JP | H03-056573 | 3/1991 | |
| JP | H03-079678 | 4/1991 | |
| JP | H03-160068 | 7/1991 | |
| JP | H04-018462 | 1/1992 | |
| JP | H06-126952 | 5/1994 | |
| JP | 2003-253179 | 9/2003 | |
| JP | 2004-142140 | 5/2004 | |
| JP | 2004-142166 | 5/2004 | |
| JP | 2004142140 A * | 5/2004 | ............... B41J 2/01 |
| JP | 3550637 | 8/2004 | |
| JP | 2005-220352 | 8/2005 | |
| JP | 2006-077232 | 3/2006 | |
| JP | 2006-212787 | 8/2006 | |
| JP | 2006-282822 | 10/2006 | |
| JP | 2007-210167 | 8/2007 | |
| JP | 2008-194827 | 8/2008 | |
| JP | 2008-231212 | 10/2008 | |
| JP | 2009-072999 | 4/2009 | |
| JP | 2009-073023 | 4/2009 | |
| JP | 2009-114454 | 5/2009 | |
| WO | 2003-033602 | 4/2003 | |
| WO | 2006-016636 | 2/2006 | |

OTHER PUBLICATIONS

Shibatani et al., "Retention and Redistribution of Ink-Jet Components in Printed Media", Sep. 20, 2006.
U.S. Appl. No. 16/407,582, filed May 28, 2020, Office Action.
U.S. Appl. No. 16/407,582, filed Sep. 4, 2020, Final Office Action.
U.S. Appl. No. 16/407,582, filed Dec. 11, 2020, Notice of Allowance.

\* cited by examiner

FIG. 4A

| | TEST 1 | | TEST 2 | | TEST 3 | |
|---|---|---|---|---|---|---|
| AMOUNT OF INK EVAPORATED IN FIRST DRYING UNIT | 40% | | 50% | | 60% | |
| TEMPERATURE OF HOT AIR IN SECOND DRYING UNIT | 70°C | | 70°C | | 60°C | |
| PAUSE TIME ON MEDIUM SUPPORTING SURFACE 53 | 40 sec | | 30 sec | | 30 sec | |
| RECORDING MEDIUM | OK TOPCOAT+ | PG-50L | PPC PAPER P | OK TOPCOAT+ | PG-50L | PPC PAPER P | OK TOPCOAT+ | PG-50L | PPC PAPER P |
| PRINT EVALUATION (1) BEADING (2) UNIFORMITY IN SOLID IMAGE (3) COLOR BLEEDING | B B B | B B B | A A A | A A A | B A B | A A A | A A A | A A A | A A A |
| CONTAMINATION OF PRINT IN REGION FROM FOURTH FEED ROLLER 71 TO SEVENTH FEED ROLLER 74 | NONE | NONE | NONE | NONE | NONE | NONE | NONE | NONE | NONE |

FIG. 4B

| | TEST 4 | | | TEST 5 | | | TEST 6 | | | TEST 7 | | |
|---|---|---|---|---|---|---|---|---|---|---|---|---|
| AMOUNT OF INK EVAPORATED IN FIRST DRYING UNIT | 70% | | | 80% | | | 85% | | | 90% | | |
| TEMPERATURE OF HOT AIR IN SECOND DRYING UNIT | 60°C | | | 50°C | | | 50°C | | | 50°C | | |
| PAUSE TIME ON MEDIUM SUPPORTING SURFACE 53 | 20 sec | | | 20 sec | | | 20 sec | | | 20 sec | | |
| RECORDING MEDIUM | OK TOPCOAT+ | PG-50L | PPC PAPER P | OK TOPCOAT+ | PG-50L | PPC PAPER P | OK TOPCOAT+ | PG-50L | PPC PAPER P | OK TOPCOAT+ | PG-50L | PPC PAPER P |
| PRINT EVALUATION (1) BEADING | A | A | A | A | A | A | A | A | A | A | A | A |
| (2) UNIFORMITY IN SOLID IMAGE | A | A | A | A | A | A | A | B | A | B | B | A |
| (3) COLOR BLEEDING | A | A | A | A | A | A | A | A | A | A | A | A |
| CONTAMINATION OF PRINT IN REGION FROM FOURTH FEED ROLLER 71 TO SEVENTH FEED ROLLER 74 | NONE | NONE | NONE | NONE | NONE | NONE | NONE | NONE | NONE | NONE | NONE | NONE |

FIG. 5

| | TEST 8 | | |
|---|---|---|---|
| AMOUNT OF INK EVAPORATED IN FIRST DRYING UNIT | 70% | | |
| TEMPERATURE OF HOT AIR IN SECOND DRYING UNIT | 70°C | | |
| PAUSE TIME ON MEDIUM SUPPORTING SURFACE 53 | 40 sec | | |
| RECORDING MEDIUM | OK TOPCOAT+ | PG-50L | PPC PAPER P |
| PRINT EVALUATION (1) BEADING (2) UNIFORMITY IN SOLID IMAGE (3) COLOR BLEEDING | A A A | B B B | A A A |
| CONTAMINATION OF PRINT IN REGION FROM FOURTH FEED ROLLER 71 TO SEVENTH FEED ROLLER 74 | CONTAMINATION OBSERVED | CONTAMINATION OBSERVED | NONE |

RECORDING METHOD

CROSS REFERENCES TO RELATED APPLICATIONS

This application is a Continuation of U.S. patent application Ser. No. 17/222,689, filed Apr. 5, 2021 which is a Continuation of U.S. patent application Ser. No. 16/407,582, filed May 9, 2019, and granted on Apr. 13, 2021 as U.S. Pat. No. 10,974,524, which is a Continuation Application of U.S. patent application Ser. No. 15/342,681, filed Nov. 3, 2016 and granted on Jun. 25, 2019 as U.S. Pat. No. 10,328,720, which is a Continuation of U.S. patent application Ser. No. 14/886,965, filed Oct. 19, 2015 and granted on Dec. 20, 2016 as U.S. Pat. No. 9,522,549, which is a Continuation of U.S. patent application Ser. No. 14/022,072, filed Sep. 9, 2013 and granted on Nov. 24, 2015 as U.S. Pat. No. 9,193,178, which is a Continuation of U.S. patent application Ser. No. 12/879,555, filed Sep. 10, 2010 and granted on Oct. 8, 2013 as U.S. Pat. No. 8,550,614, which claims the benefit of and priority to Japanese Patent Application No. 2009-210177, filed Sep. 11, 2009. The entire disclosures of the above-mentioned patent applications are expressly incorporated herein by reference.

BACKGROUND

1. Technical Field

The present invention relates to a recording method for recording high-quality images at high speed on a recording medium having no or low ink-absorbing property.

2. Related Art

A typical ink-jet recording apparatus such as one disclosed in Japanese Unexamined Patent Application Publication No. 6-126952 is equipped with a pre-heating lamp and a blower to dry ink. The pre-heating lamp heats driving rollers, and the driving rollers heat a recording medium before the recording medium passes through a printing zone. The blower heats the recording medium in the printing zone by applying strong air toward the recording medium immediately after completion of printing.

However, an apparatus that uses a typical drying unit cannot print high-quality images at high speed by an ink jet recording technique on a recording medium, such as a cast paper for offset printing or a plastic film, that has a significantly low ink-absorbing property. For example, nonuniformity in line width (beading) occurs when ruled lines are printed, and color nonuniformity and mixing of different colors (color bleeding) occur when a solid image is printed.

SUMMARY

It is advantageous to provide a recording method for recording an image on a recording medium having a substantially low ink-absorbing property at high speed by an ink jet technique.

According to an aspect of the invention, a recording method includes a first drying step of evaporating 50 to 85 wt % of ink adhering on a recording medium, the ink being ejected from a recording head onto a surface of the recording medium, back side of which is supported by a medium-supporting unit which faces the recording head, and a second drying step of drying the recording medium, which has been subjected to the first drying step, at the downstream side of the medium-supporting unit in a feeding direction of the recording medium.

Preferably, in the first drying step, 60 to 80 wt % of the ink adhering on the recording medium is evaporated. The first drying step preferably employs a thermal conduction technique and/or a convection technique.

The "thermal conduction technique" involves conducting heat from a high-temperature part to a low-temperature part through the interior of an object. In other words, it is a type of technique by which heat is conducted to a recording medium side as a hot object contacts the recording medium (medium onto which ejection is performed). The "convection technique" involves conducting heat through a fluid such as gas or liquid.

After the ink ejected from the recording head adheres onto a recording medium, the ink is heated in the first drying unit and 50 wt % or more and preferably 60 wt % or more of the ink components adhering on the recording medium are evaporated. If the amount evaporated is less than this, nonuniformity of line width (beading) occurs when ruled lines are printed and color nonuniformity and mixing of different colors (color bleeding) occur when solid images are printed.

After the ink ejected from the recording head adheres onto the recording medium, the ink is heated in the first drying unit but the ink components adhering on the recording medium are not to be evaporated exceeding 85 wt % and more preferably exceeding 80 wt %. If the ink components in an amount exceeding this are evaporated, the dot diameter of the adhering ink droplet on the recording medium may become insufficient, possibly resulting in disconnected ruled lines and nonuniformity in solid images. Moreover, since the thickness of the adhering dots of ink droplets increases, friction resistance may decrease.

Preferably, the second drying step employs a convection technique. Preferably, the recording medium is a film material.

The ink preferably at least contains (1) a colorant, (2) a resin, (3) a water-soluble resin solvent, (4) a medium-volatile humectant, (5) a water-soluble penetration solvent, (6) a surfactant, and (7) water. The water-soluble resin solvent, the medium-volatile humectant, and the water-soluble penetration solvent are preferably organic solvents having a boiling point of 100° C. or more and 250° C. or less.

The recording medium preferably has no or low ink-absorbing property. Examples of the recording medium that has no ink-absorbing property include plastic films having surfaces not treated for ink jet printing (i.e., plastic films without ink-absorbing layers), and materials, such as paper, that are coated with plastic or bonded with plastic films. Examples of the plastic include polyvinyl chloride, polyethylene terephthalate, polycarbonate, polystyrene, polyurethane, polyethylene, and polypropylene. Examples of the recording medium that has low ink-absorbing property include printing paper such as art paper, coated paper, and mat paper.

A recording medium that has no or low ink-absorbing property is a recording medium having a print surface in which the amount water absorption from the start of the contact to 30 msec is 10 mL/m$^2$ or less in a Bristow test. The Bristow test is the most prevalent method for measuring the amount of liquid absorbed in a short time and is also employed in Japan Technical Association of the Pulp and Paper Industry (JAPAN TAPPI). The details of the test procedure are described in "JAPAN TAPPI Test Methods, 2000 version", Standard No. 51, "Paper and Paperboard—Liquid absorption test method—Bristow's method".

The ink preferably at least includes the following:
(1) a pigment as the colorant: 0.5 to 10 wt %
(2) at least one resin selected from the group consisting of a colorant dispersant, a resin emulsion, and a water-soluble resin: 0.5 to 10 wt %
(3) at least one organic solvent serving as the water-soluble resin solvent, the at least one organic solvent being selected from the group consisting of N-methylpyrrolidone, N-ethylpyrrolidone, N-vinylpyrrolidone, 2-pyrrolidone, dimethyl sulfoxide, s-caprolactam, methyl lactate, ethyl lactate, isopropyl lactate, butyl lactate, ethylene glycol monomethyl ether, ethylene glycol dimethyl ether, ethylene glycol monomethyl ether acetate, diethylene glycol monomethyl ether, diethylene glycol dimethyl ether, diethylene glycol ethyl methyl ether, diethylene glycol diethyl ether, diethylene glycol isopropyl ether, propylene glycol monomethyl ether, propylene glycol dimethyl ether, dipropylene glycol monomethyl ether, dipropylene glycol dimethyl ether, and 1,4-dioxane: 2 to 10 wt %
(4) at least one organic solvent serving as the medium-volatile humectant, the at least one organic solvent being selected from the group consisting of ethylene glycol, diethylene glycol, propylene glycol, dipropylene glycol, 1,3-propanediol, 1,4-butanediol, hexylene glycol, and 2,3-butanediol: 2 to 15 wt %
(5) at least one organic solvent that serves as the water-soluble penetration solvent, the at least one organic solvent being selected from the group consisting of n-butanol, 1,2-hexanediol, 1,3-hexanediol, 1,2-heptanediol, 1,3-heptanediol, 1,2-octanediol, 1,3-octanediol, 1,2-pentanediol, triethylene glycol monobutyl ether, diethylene glycol monobutyl ether, diethylene glycol monopropyl ether, diethylene glycol monopentyl ether, and propylene glycol monobutyl ether: 1 to 8 wt %
(6) at least one surfactant selected from the group consisting of acetylene glycol surfactants and silicone surfactants: 0.5 to 2 wt %
(7) water: 50 to 80 wt %.

The colorants used in chromatic or achromatic inks are water-insoluble colorants, i.e., pigments. An example of a preferable colorant for an achromatic black ink is carbon black.

Specific examples of carbon black include, but are not limited to, No. 2300, 900, MCF88, No. 20B, No. 33, No. 40, No. 45, No. 52, MA7, MA8, MA100, and No. 2200B (trade names, produced by Mitsubishi Chemical Corporation), Color Black FW1, FW2, FW2V, FW18, FW200, S150, S160, and S170, Printex 35, U, V, and 140U, and Special Black 6, 5, 4A, 4, and 250 (trade names, produced by Degussa), Conductex SC and Raven 1255, 5750, 5250, 5000, 3500, 1255, and 700 (trade names, produced by Columbian Carbon Japan Ltd.), and Regal 400R, 330R, and 660R, Mogul L, Monarch 700, 800, 880, 900, 1000, 1100, 1300, and 1400, and Elftex 12 (trade names, produced by Cabot Corporation). These carbon blacks may be used alone or in combination.

Examples of preferable organic pigments for chromatic inks include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

Specific examples of cyan pigments include C.I. Pigment Blue 1, 2, 3, 15:3, 15:4, 15:34, 16, 22, and 60; and C.I. Vat Blue 4 and 60. Preferably, the cyan pigment is one or a mixture of two or more selected from the group consisting of C.I. Pigment Blue 15:3, 15:4, and 60.

Examples of the magenta pigment include C.I. Pigment Red 5, 7, 12, 48(Ca), 48(Mn), 57(Ca), 57:1, 112, 122, 123, 168, 184, and 202, and C.I. Pigment Violet 19. Preferably, the magenta pigment is one or a mixture of two or more selected from the group consisting of C.I. Pigment Red 122, 202, and 209 and C.I. Pigment Violet 19.

Examples of the yellow pigment include C.I. Pigment Yellow 1, 2, 3, 12, 13, 14C, 16, 17, 73, 74, 75, 83, 93, 95, 97, 98, 109, 110, 114, 128, 129, 138, 150, 151, 154, 155, 180, and 185. Preferably, the yellow pigment is one or a mixture of two or more selected from the group consisting of C.I. Pigment Yellow 74, 109, 110, 128, and 138.

The pigment used in an orange pigment dispersion is C.I. Pigment Orange 36 or 43 or a mixture of C.I. Pigment Orange 36 and 43.

The pigment used in a green pigment dispersion is one or a mixture of C.I. Pigment Green 7 and 36. The pigment may be dispersed in a resin using a dispersion resin or may be processed into a self-dispersing pigment by surface oxidation with hypochlorous acid, fuming sulfuric acid, etc., or by sulfonation.

Preferable examples of the dispersant for the colorant of the ink, the resin emulsion, or the water-soluble resin are as follows.

Since these resins must have water-dispersibility even when they are insoluble in water, the resins are preferably polymers that have both a hydrophilic portion and a hydrophobic portion. When a thermoplastic resin is used as the resin emulsion, the particle diameter is not particularly limited as long as an emulsion is formed, but is preferably about 150 nm or less and more preferably about 5 nm to 100 nm.

A resin component such as a dispersant resin or resin emulsion that has been used in ink jet recording ink compositions can be used as the thermoplastic resin. Examples of the thermoplastic resins that can be used include acryl polymers such as polyacrylates and copolymers thereof, polymethacrylate and copolymers thereof, polyacrylonitrile or copolymers thereof, polycyanoacrylate, polyacrylamide, polyacrylic acid, and polymethacrylic acid; polyolefin polymers such as polyethylene, polypropylene, polybutene, polyisobutylene, and polystyrene and copolymers thereof, petroleum resin, coumarone-indene resin, and terpene resin; vinyl acetate-vinyl alcohol polymers such as polyvinyl acetate and copolymers thereof, polyvinyl alcohol, polyvinyl acetal, and polyvinyl ether; halogen-containing polymers such as polyvinyl chloride and copolymers thereof, polyvinylidene chloride, fluorine resin, and fluorine rubber; nitrogen-containing vinyl polymers such as polyvinyl carbazole, polyvinyl pyrrolidone and copolymers thereof, polyvinyl pyridine, and polyvinyl imidazole; diene polymers such as polybutadiene and copolymers thereof, polychloroprene, and polyisopylene (butyl rubber); and other opening-ring polymerization resins, condensation polymerization resins, and natural high-molecular-weight resins.

Still other examples of the thermoplastic resin include Hitec E-7025P, Hitec E-2213, Hitec E-9460, Hitec E-9015, Hitec E-4A, Hitec E-5403P, and Hitec E-8237 (trade names, produced by Toho Chemical Industry Co., Ltd.) and AQUACER 507, AQUACER 515, and AQUACER 840 (trade names, produced by BYK Japan KK).

A thermoplastic resin in an emulsion form can be obtained by mixing resin particles with water along with, if necessary, a surfactant. For example, an emulsion of an acrylic resin or a styrene-acrylic acid copolymer resin can be obtained by mixing a (meth)acrylate resin or a styrene-(meth)acrylate resin and, optionally, a (meth)acrylic acid resin and a surfactant, in water. The mixing ratio of the resin component to the surfactant is preferably about 50:1 to 5:1. When the amount of surfactant is below this range, an emulsion is not easily formed. If the amount of surfactant exceeds this range, the water resistance and the adhesiveness of the ink may be degraded.

The surfactant used here is not particularly limited. Preferable examples thereof include anionic surfactants (e.g., sodium dodecylbenzenesulfonate, sodium lauryl sulfate, and ammonium salts of polyoxyethylene alkyl ether sulfate), and nonionic surfactants (e.g., polyoxyethylene alkyl ether, polyoxyethylene alkyl ester, polyoxyethylene sorbitan fatty acid ester, polyoxyethylene alkyl phenyl ether, polyoxyethylene alkyl amine, and polyoxyethylene alkyl amide). These may be used as a mixture of two or more. The emulsion of the thermoplastic resin can also be obtained by emulsification polymerization of monomers of the resin components mentioned above in water in the presence of a polymerization catalyst and an emulsifier. The polymerization initiator, the emulsifier, and a molecular weight adjustor used for the emulsion polymerization can be used according to common procedures.

A polymerization initiator usually used in radical polymerization may be used as the polymerization initiator. Examples thereof include potassium persulfate, ammonium persulfate, hydrogen peroxide, azobisisobutyronitrile, benzoyl peroxide, dibutyl peroxide, peracetic acid, cumene hydroperoxide, tert-butyl hydroxyperoxide, and paramenthane hydroxyperoxide. When polymerization is conducted in water, a water-soluble polymerization initiator is preferably used. Examples of the emulsifier include, in addition to sodium lauryl sulfate, anionic surfactants, nonionic surfactants, and ampholytic surfactants commonly used and mixtures thereof. Two or more types of emulsifiers may be used as a mixture.

The ratio of the water to the resin as the disperse phase is preferably 60 to 400 parts by weight and more preferably 100 to 200 parts by weight of water per 100 parts by weight of the resin.

When a resin emulsion is used as a thermoplastic resin, a common resin emulsion may be used. For example, resin emulsions disclosed in Japanese Examined Patent Application Publication No. 62-1426, and Japanese Unexamined Patent Application Publication Nos. 3-56573, 3-79678, 3-160068, and 4-18462 can be directly used. Commercially available resin emulsions can also be used. Examples thereof include Microgel E-1002 and E-5002 (styrene-acryl resin emulsion produced by Nippon Paint), VONCOAT (registered trademark) 4001 (acryl resin emulsion, produced by DIC Corporation) VONCOAT 5454 (styrene-acryl resin emulsion, produced by DIC Corporation), SAE1014 (styrene-acryl resin emulsion, produced by Zeon Corporation), and Saibinol (registered trademark) SK-200 (acryl resin emulsion, produced by Saiden Chemical Industry Co.). The thermoplastic resin may take a form of fine powder and mixed with other components in the water-based ink. Preferably, resin fine particles of the thermoplastic resin is dispersed in a water medium to form a resin emulsion and then the resin emulsion is mixed with other components of the water-based ink. The diameter of the resin fine particles is preferably in the range of 5 to 400 nm and more preferably in the range of 50 to 200 nm from the standpoints of long-term storage stability and ejection stability of the water-based ink.

Examples of the water-soluble resin include polymers such as polyethylene glycol, polyvinyl pyrrolidone, polyvinyl alcohol, and polyvinyl acetal.

The resin is preferably contained in an amount of 0.5 to 10.0 wt % in terms of solid content relative to the total of the water-based ink. If the resin content is excessively low, the ink coating formed on the surface of the plastic becomes thin and sufficient adhesiveness may not be obtained between the plastic surface and the ink coating. If the resin content is excessively high, dispersion of the resin may become instable during storage of the ink composition and an even coating may not be formed due to aggregation and solidification of resin components caused by evaporation of trace amounts of water.

Preferred examples of the water-soluble penetration solvent and surfactant added to the ink are as follows.

Examples of the water-soluble penetration solvent include n-butanol, 1,2-hexanediol, 1,3-hexanediol, 1,2-heptanediol, 1,3-heptanediol, 1,2-octanediol, 1,3-octanediol, 1,2-pentanediol, triethylene glycol monobutyl ether, diethylene glycol monobutyl ether, diethylene glycol monopropyl ether, diethylene glycol monopentyl ether, and propylene glycol monobutyl ether. The water soluble penetration solvent content in the entire ink composition is preferably 1 to 8 wt %.

Preferred examples of the acetylene glycol surfactants used in the ink include Surfynol (registered trademark) 104E, 104H, 104A, 104BC, 104DPM, 104PA, 104PG-50, 104S, 420, SE, SE-F, 61, 82, and DF-110D (trade names, produced by Nissin Chemical Co., Ltd.) and Acetylenol (registered trademark) E00 and E00P (trade names, produced by Kawaken Fine Chemicals Co., Ltd.).

A polysiloxane compound is preferably used as a silicone surfactant in the ink. Examples thereof include polyether-modified organosiloxanes. For example, silicon additives BYK-306, BYK-307, BYK-333, BYK-341, BYK-345, BYK-346, and BYK-348 available from BYK Japan KK are preferred.

A combination of a silicone surfactant and an acetylene glycol surfactant having an hydrophile-lipophile balance (HLB) value of 6 or less is particularly preferable. The surfactant content is preferably 0.5 to 2 wt %.

When the combination of the water-soluble penetration solvent and the surfactant is used, the surface tension of the water-based ink is preferably in the range of 23.0 mN/m to 40.0 mN/m and more preferably in the range of 25.0 mN/m to 35.0 mN/m.

The water-soluble resin solvent used in the ink is selected from water-soluble solvents compatible with the resin emulsion in the resin ink. Although the optimum combination varies with the type of resin used, preferable examples of the water-soluble resin solvent include pyrrolidones such as N-methylpyrrolidone, N-ethylpyrrolidone, N-vinylpyrrolidone, and 2-pyrrolidone, dimethyl sulfoxide, ε-caprolactam, methyl lactate, ethyl lactate, isopropyl lactate, butyl lactate, ethylene glycol monomethyl ether, ethylene glycol dimethyl ether, ethylene glycol monomethyl ether acetate, diethylene glycol monomethyl ether, diethylene glycol dimethyl ether, diethylene glycol ethyl methyl ether, diethylene glycol diethyl ether, diethylene glycol isopropyl ether, propylene glycol monomethyl ether, propylene glycol dimethyl ether, dipropylene glycol monomethyl ether, dipropylene glycol dimethyl ether, and 1,4-dioxane. Pyrrolidones are particularly preferable since they have sufficient drying rate and accelerate formation of coatings.

The water-soluble resin solvent in the ink may be added to a chromatic and/or achromatic ink or a resin ink that contains no colorant and is effective for increasing the strength of the coatings.

Specific examples of the water-soluble resin solvent include N-methylpyrrolidone, N-ethylpyrrolidone, N-vinylpyrrolidone, 2-pyrrolidone, dimethyl sulfoxide, s-caprolactam, methyl lactate, ethyl lactate, isopropyl lactate, butyl lactate, ethylene glycol monomethyl ether, ethylene glycol dimethyl ether, ethylene glycol monomethyl ether acetate, diethylene glycol monomethyl ether, diethylene glycol dimethyl ether, diethylene glycol ethyl methyl ether, diethylene glycol diethyl ether, diethylene glycol isopropyl ether, propylene glycol monomethyl ether, propylene glycol dimethyl ether, dipropylene glycol monomethyl ether, dipropylene glycol dimethyl ether, and 1,4-dioxane.

The amount of the water-soluble resin solvent added is preferably 2 to 10 wt %.

The medium-volatile humectant used in the ink is preferably a humectant that does not remain in the coating films of a print during drying. Examples thereof include diethylene glycol, propylene glycol, dipropylene glycol, 1,3-propanediol, 1,4-butanediol, hexylene glycol, and 2,3-butanediol.

For example, when a humectant having a low boiling point, such as glycerin, is added to the ink, a large amount of energy is needed in the second drying unit for heating in order to print images on a recording medium, such as a PET film, having no ink absorbing property. This leads to an increase in size of apparatuses and power consumption during operation of the recording apparatus. If the ink is not sufficiently dried in the second drying unit, a print may have insufficient water resistance and scratch resistance and print contamination may occur in the recording medium transport drive unit in the recording apparatus. In order to obtain a high-quality print, 50 to 85 wt % and more preferably 60 to 80 wt % of ink must be evaporated in the first drying unit. However, controlling the conditions of the heating device so that this state is achieved becomes extremely difficult and a large load is imposed on the apparatus.

Water is a main solvent of the ink. Preferable examples of water include pure water and ultrapure water obtained by ion exchange, ultrafiltration, reverse osmosis, and distillation since ionic impurities can be eliminated as much as possible. Use of water sterilized by UV irradiation, addition of hydrogen peroxide, etc., is also preferred since generation of molds and bacteria can be suppressed when the pigment dispersion or the water-based ink containing the pigment dispersion is stored for a long time.

Examples of the additives that can be used if needed are a preservative, a fungicide, a pH adjustor, an antioxidant, and a metal trapping agent.

Examples of the preservative and fungicide include sodium benzoate, sodium pentachlorophenol, sodium 2-pyridinethiol-1-oxide, sodium sorbate, sodium dehydroacetate, 1,2-dibenzisothiazolin-3-on (Proxel CRL, Proxel BDN, Proxel GXL, Proxel XL-2, and Proxel TN produced by ICI).

Examples of the PH adjustor include inorganic alkalis such as sodium hydroxide and potassium hydroxide, ammonia, diethanolamine, triethanolamine, triisopropanolamine, morpholine, potassium dihydrogenphosphate, and disodium hydrogenphosphate.

Examples of the metal trapping agent include disodium ethylene diamine tetraacetate.

BRIEF DESCRIPTION OF THE DRAWINGS

The invention will be described with reference to the accompanying drawings, wherein like numbers reference like elements.

FIGS. 4A and 4B are tables showing the results of Tests 1 to 7.

FIG. 5 is a table showing the results of Test 8.

DESCRIPTION OF EXEMPLARY EMBODIMENTS

Figure 1:
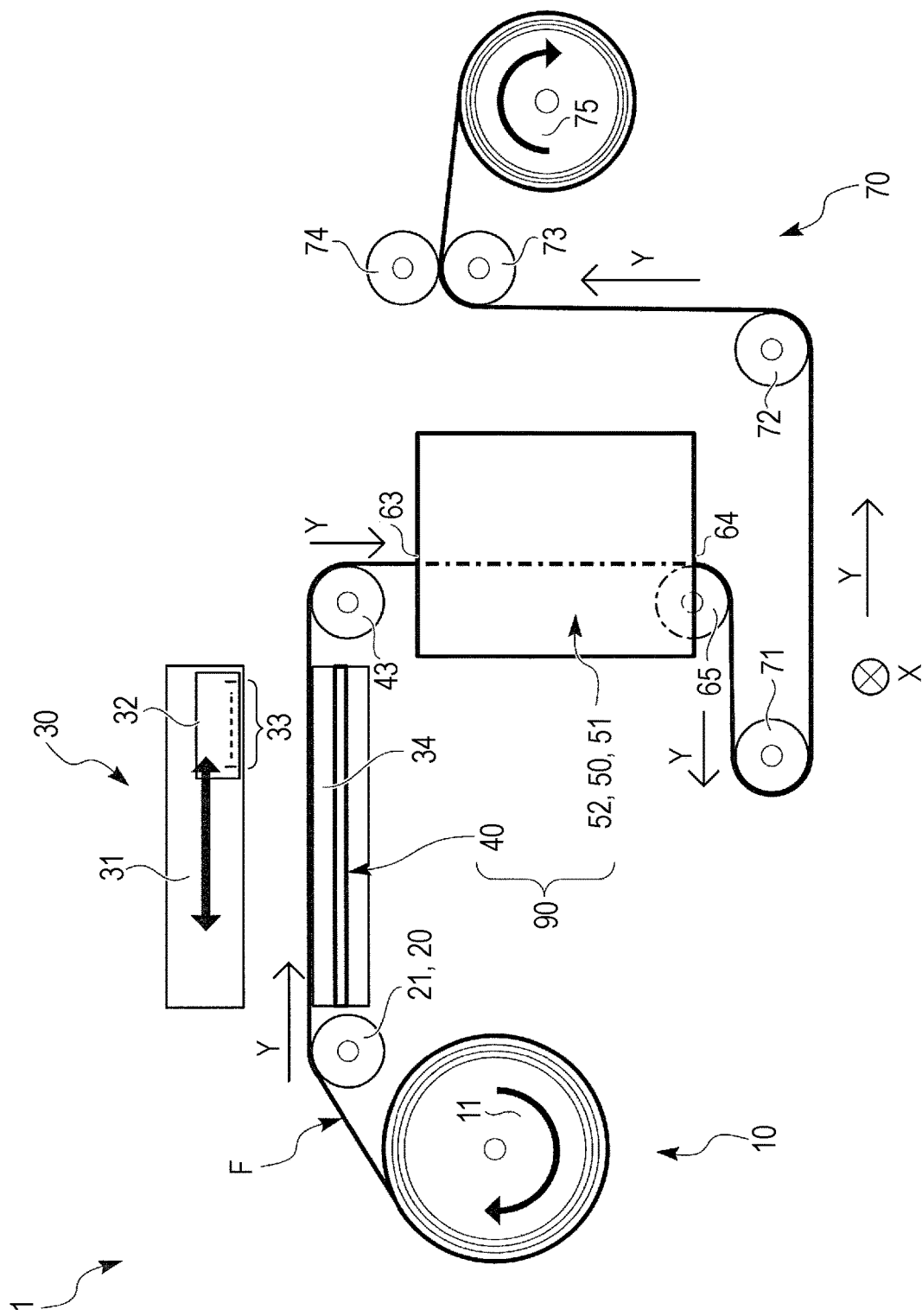
FIG. 1 is a schematic side view of the entirety of an ink jet recording apparatus.

Embodiments of the invention will now be described with reference to the drawings. FIG. 1 is a schematic side view of an entire ink jet recording apparatus 1.

As shown in FIG. 1, the ink jet recording apparatus 1 includes a recording medium feeding unit 10, a transporting unit 20, a recording unit 30, a dryer 90, and a discharge unit 70. The dryer 90 includes a first drying unit 40 configured to conduct a first drying step and a second drying unit 50 configured to conduct a second drying step described below. The recording medium feeding unit 10 is configured to feed a rolled recording medium F, which is an example of a recording medium or a medium onto which an ink is ejected, to the transporting unit 20. In particular, the recording medium feeding unit 10 includes a rolled medium holder 11 that retains the rolled recording medium F. When the rolled recording medium F is rotated, the recording medium F is fed to the transporting unit 20 in the downstream feeding direction.

Although the recording medium F is described in this embodiment, the recording medium may naturally be any other material such as paper or a plastic film.

The transporting unit 20 is configured to transport the recording medium F fed from the recording medium feeding unit 10 to the recording unit 30. In particular, the transporting unit 20 includes a first feed roller 21 and is configured to further transfer the recording medium F that has been fed to the recording unit 30 downstream in the feeding direction.

The recording unit 30 is configured to record images by ejecting an ink L (refer to FIG. 2), which is an example of a liquid, toward the recording medium F transferred from the transporting unit 20. The recording unit 30 includes a platen 34 serving as a medium-supporting unit, a carriage 31, and a recording head 32. The platen 34 is configured to support the recording medium F from the back side. The carriage 31 is arranged to face the platen 34 and is configured to move in a width direction X relative to a feeding direction Y of the recording medium F by the motive power from a carriage motor (not shown) while being introduced along a first guide shaft (not shown).

The recording head 32 is installed in the carriage 31 and is configured to move integrally with the carriage 31 in the width direction X. The recording head 32 is configured to move relative to the carriage 31 in the feeding direction Y. In particular, the recording head 32 is configured to move in the feeding direction Y by the motive power from a recording head motor (not shown) while being guided along a second guide shaft (not shown). In other words, the recording head 32 is configured to move in the feeding direction Y and the width direction X in the range in which the recording head 32 opposes the platen 34. Recording on the recording medium F can be performed by ejecting the ink L from a nozzle row 33 formed in a surface of the recording head 32 opposing the platen 34.

The platen 34 includes the first drying unit 40 for evaporating 40 to 80 wt % of the ink components in the ink L ejected onto the recording medium F, as described in detail below. A second feed roller 43 is provided at the downstream of the platen 34 in the feeding direction. The second feed roller 43 is configured to feed the recording medium F, on which the recording has been conducted, to the second drying unit 50 downstream in the feeding direction.

The second drying unit 50 is configured to further evaporate part of the residual components in the ink L ejected onto the recording medium F, as described in detail below. A third feed roller 65 is disposed near an outlet 64 of the second drying unit 50. The third feed roller 65 is arranged to contact the back side of the recording medium F and configured to feed the recording medium F to the discharge unit 70 downstream in the feeding direction.

The discharge unit 70 is configured to further feed the recording medium F fed from the second drying unit 50 toward the downstream side in the feeding direction and eject the recording medium F to outside the ink jet recording apparatus 1. The discharge unit 70 includes a fourth feed roller 71, a fifth feed roller 72, a sixth feed roller 73, a seventh feed roller 74, and a take-up roller 75. Of these rollers, the fourth feed roller 71 and the fifth feed roller 72 are arranged to contact the front side of the recording medium F. The sixth feed roller 73 and the seventh feed roller 74 are arranged to form a roller pair. The recording medium F ejected by the sixth feed roller 73 and the seventh feed roller 74 is taken up by the take-up roller 75.

Figure 2:
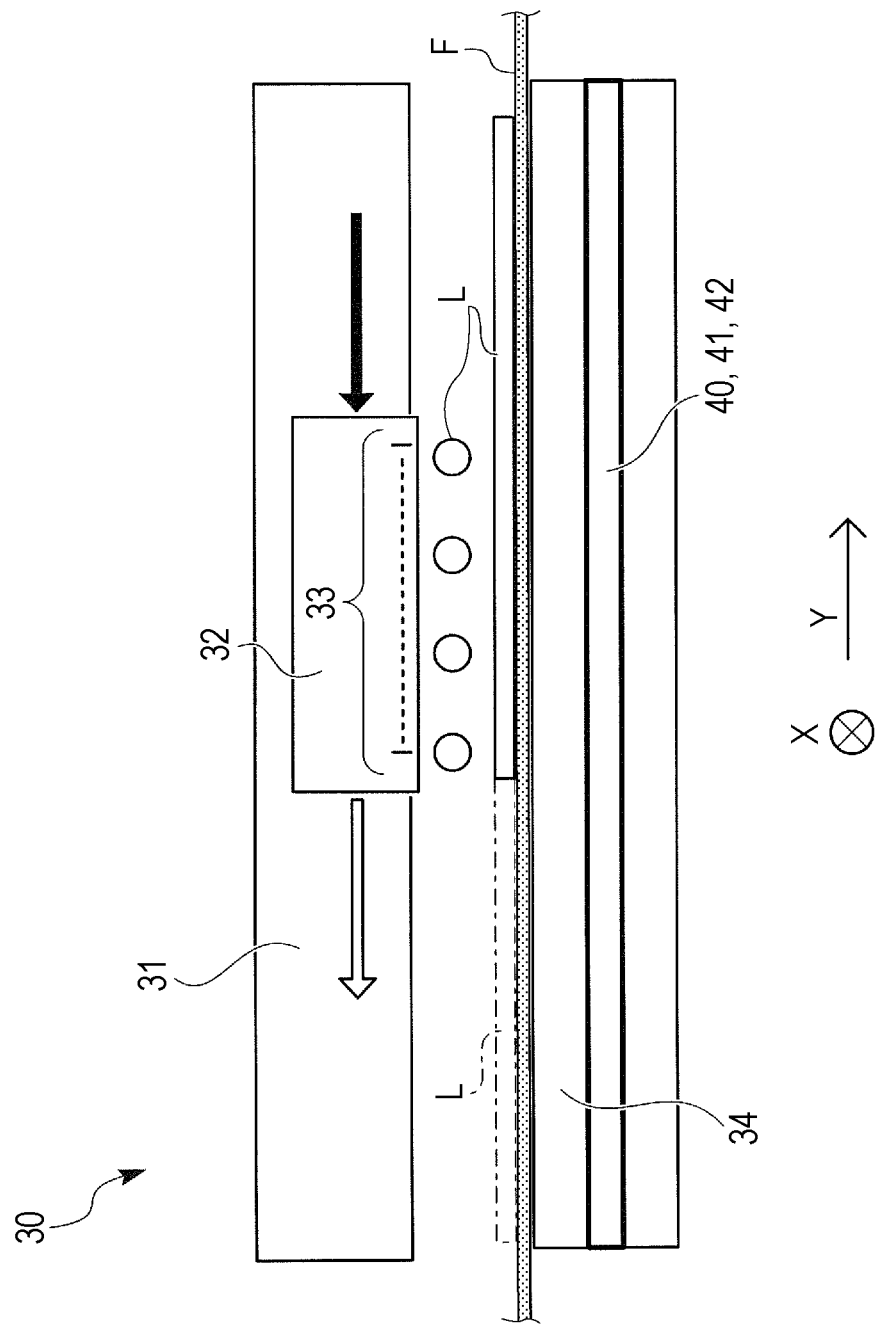
FIG. 2 is a schematic side view of a recording unit of a printer, which is an example of the ink jet recording apparatus.

A first drying step will now be described. FIG. 2 is a schematic side view of the recording unit 30 of a printer, which is one example of the ink jet recording apparatus.

As shown in FIG. 2, the platen 34 includes the first drying unit 40. To be more specific, the first drying unit 40 includes a first nichrome wire 42 which is one example of a thermal conduction-type heating unit 41. The first nichrome wire 42 is arranged inside the entire region of the platen 34 so as to keep a particular distance from the upper surface of the platen 34. When electricity is supplied, the first nichrome wire 42 generates heat and the heat can be conducted through the platen 34 to the back side of the recording medium F on the platen 34.

Since the first nichrome wire 42 is provided in the entire region of the platen 34, heat can be generated in all parts of the platen 34. Since the surface of the platen 34 is flat and smooth without irregularities, the upper surface of the platen 34 makes uniform contact with the recording medium F. The distance between the first nichrome wire 42 and the upper surface of the platen 34 is constant. Thus, heat can be uniformly conducted to the recording medium F on the platen 34. In other words, the recording medium F can be uniformly warmed.

In this embodiment, the recording medium F is a plastic film. The recording medium F fed onto the platen 34 of the recording unit 30 takes a pause. While the recording head 32 is positioned to oppose the downstream side of the platen 34 in the feeding direction, the carriage 31 moves in the width direction X and the ink L is ejected to conduct recording.

Next, the recording head 32 moves toward the upstream side in the feeding direction relative to the carriage 31 by a distance equal to the length of the nozzle row 33. Then the carriage 31 moves in the width direction X and the ink L is ejected to conduct recording.

Then the recording head 32 moves toward the upstream side in the feeding direction relative to the carriage 31 by a distance equal to the length of the nozzle row 33. The carriage 31 moves in the width direction X and ink is ejected to conduct recording. This is repeated a plurality of times, i.e., scanning is performed a plurality of times, until the recording head 32 moves to a position opposing the upstream side of the platen 34 in the feeding direction, the carriage 31 moves in the width direction X in this state, and the ink L is ejected to conduct recording.

Then the recording medium F is fed toward the downstream side in the feeding direction by a distance equal to the length of the platen 34 in the feeding direction Y, i.e., a distance equal to the length (length in the feeding direction Y) of the region on which recording is made by plural times of scanning, and takes another pause. Recording is conducted on the recording medium F on the platen 34 by plural times of scanning. This is so called intermittent feeding.

Here, the first drying unit 40 is not of a convection type but of a thermal conduction type. Accordingly, the nozzle row 33 of the recording head 32 is not directly exposed to hot air and the condition of the nozzle row 33 of the recording head 32 thereby remains unaffected. In particular, the increase in viscosity caused by drying of the ink L in the nozzles and ejection failures caused thereby can be avoided. The temperature of the first drying unit 40 is relatively lower than that of the second drying unit 50. The "low temperature" means that the temperature is low enough not to affect the state of the nozzle row 33 of the recording head 32.

Figure 3:
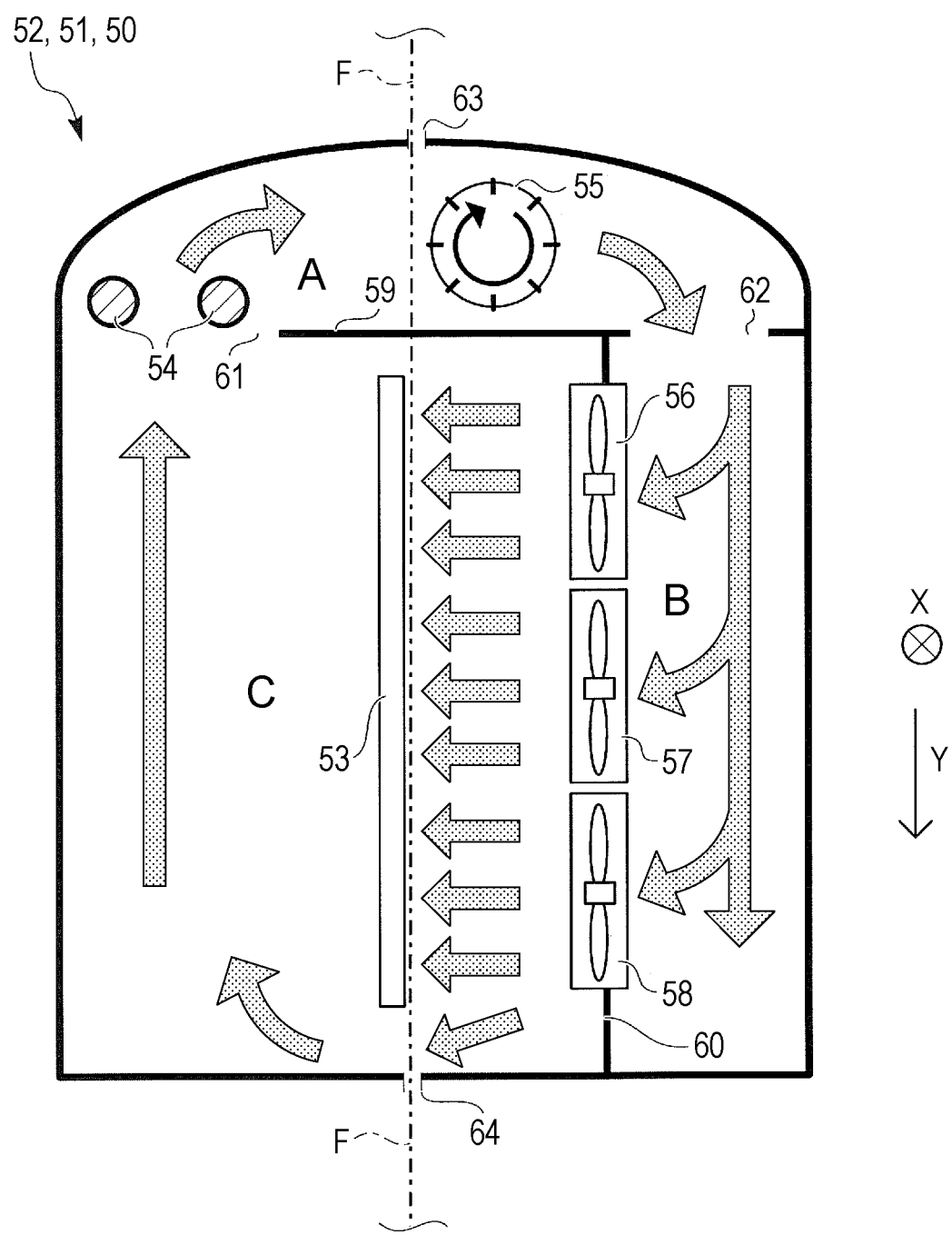
FIG. 3 is a schematic side view of an interior of a second drying unit of a printer, which is an example of the ink jet recording apparatus.

A second drying step will now be described. FIG. 3 is a schematic side view of the interior of the second drying unit of a printer which is one example of the ink jet recording apparatus.

As shown in FIG. 3, the second drying unit 50 includes a drying oven 52, which is one example of a convection-type heating unit 51. A first partition plate 59, a second partition plate 60, a first port 61, a second port 62, a medium-supporting plate 53, a second nichrome line 54, a cross flow fan 55, a first axial flow fan 56, a second axial flow fan 57, and a third axial flow fan 58 are disposed inside the drying oven 52.

The first partition plate 59 and the second partition plate 60 are arranged to define spaces A, B, and C. The first port 61 is formed to allow air to flow between the space A and the space C. The second port 62 is formed to allow air to flow between the space A and the space B. The medium-supporting plate 53 is configured to support the recording medium F fed to the interior of the drying oven 52 from an inlet 63.

When electricity is fed to the second nichrome line 54, the second nichrome line 54 generates heat and heats air in the space A defined by the first partition plate 59. In particular, air coming into the space A from the first port 61 is heated. The cross flow fan 55 generates a stream that sends air heated with the second nichrome line 54 in the space A to the space B through the second port 62.

The "cross flow fan" is a fan that has a relatively small diameter and a relatively large length in the transverse direction, suctions air in one of the radial directions of the impeller, and delivers air from the other of the radial directions. The cross flow fan is also referred to as a transverse fan.

The first axial flow fan 56, the second axial flow fan 57, and the third axial flow fan 58 are installed in the second partition plate 60 and arranged to substantially perpendicularly apply hot air in the space B onto the surface of the recording medium F on the medium-supporting plate 53 in the space C. The hot air applied to the recording medium F passes by the medium-supporting plate 53 and flows into the space A through the first port 61.

In this embodiment, the temperature of the hot air blown from the first axial flow fan 56, the second axial flow fan 57, and the third axial flow fan 58 is 60° C. to 100° C. on the medium-supporting plate 53. This is higher than the temperature of the first drying unit 40. According to this structure, an organic solvent which is not as easily evaporated as moisture can be evaporated rapidly with relatively strong wind at high temperature so that the ink L can be dried.

The ink L on the surface of the recording medium F already has an increased viscosity as described above and thus the ink L remains substantially undisturbed despite blowing of a strong wind. To be more specific, the ink L does not move on the surface of the recording medium F despite the strong blow. The organic solvent which is difficult to evaporate can be efficiently evaporated in a short time by applying a strong wind at a high temperature.

As mentioned earlier, the recording medium F according to this embodiment is intermittently fed. The length of the time the recording medium F pauses on the medium-supporting plate 53 is about 5 to 50 seconds. The evaporation of the ink L ejected onto the surface of the recording medium F can be accelerated during this pause to accelerate drying. The state of drying can be adjusted by controlling the temperature of the hot air, the length of time of the pause, the organic solvent component in the ink, etc.

In particular, when the recording medium is a recording medium F that does not absorb moisture or organic solvents in the ink components, two-step drying using the first drying unit 40 and the second drying unit 50 according to this embodiment is effective. The ink L can be efficiently dried in this manner even when the recording medium is paper. This is effective even for recording methods that involves ejecting larger quantities of ink L compared to standard methods because the ink L can be efficiently dried.

The cross flow fan 55 and the first partition plate 59 are disposed at positions that do not interfere with the recording medium F entering through the inlet 63 and existing from the outlet 64 and that do not overlap the recording medium F in the width direction X.

When the evaporation of the ink components in the second drying unit 50 is not sufficiently accelerated and drying is insufficient, the ink may adhere onto the fourth feed roller 71 to the seventh feed roller 74 in the discharge unit 70 and the resulting printout may become contaminated.

The invention will now be described in detail by using examples below that do not limit the scope of the invention.

Example 1

Ink
Preparation of Ink
Preparation of Cyan Ink Composition 1

A cyan ink composition 1 was prepared using the following materials:
C.I. pigment blue 15:3 as a colorant: 4 wt %
Acrylic acid-acrylate copolymer (molecular weight: 25000, glass transition temperature: 80° C., and acid value 180) as a dispersion resin for the colorant: 2 wt %
Styrene-acrylic acid copolymer (molecular weight: 50000, acid value 130, and mean particle diameter: 75 nm) as a resin emulsion: 2 wt %
1,2-Hexanediol as a water-soluble penetration solvent: 5 wt % Surfynol DF-110D (trade name, produced by Nissin Chemical Industry Co., Ltd.) as an acetylene glycol surfactant: 0.2 wt %
BYK-348 (trade name, polyether-modified organosiloxane produced by BYK Japan) as a silicone surfactant: 0.6 wt % 2-Pyrrolidone as a water-soluble resin solvent: 5 wt %
Propylene glycol as a medium-volatile humectant: 10 wt %
Pure water: balance Preparation of Magenta Ink Composition 2 and Yellow Ink Composition 3

A magenta ink composition 2 was prepared as with the cyan ink composition 1 except that the colorant was changed to 5 wt % C.I. pigment red 122. A yellow ink composition 3 was prepared as with the cyan ink composition 1 except that the colorant was changed to 6 wt % C.I. pigment yellow 180.

Preparation of Black Ink Composition 4

A black ink composition was prepared using the following materials:
Carbon black MA77 (trade name, produced by Mitsubishi Chemical Corporation) as a colorant: 6 wt %
Acrylic acid-acrylate copolymer (molecular weight: 25000, glass transition temperature: 80° C., and acid value 180) as a dispersion resin for the colorant: 2 wt %
Styrene-acrylic acid copolymer (molecular weight: 50000, acid value 130, and mean particle diameter: 75 nm) as a resin emulsion: 2 wt %
1,2-Hexanediol as a water-soluble penetration solvent: 5 wt % Surfynol DF-110D (trade name, produced by Nissin Chemical Industry Co., Ltd.) as an acetylene glycol surfactant: 0.2 wt %
BYK-348 (trade name, polyether-modified organosiloxane produced by BYK Japan) as a silicone surfactant: 0.4 wt % 2-Pyrrolidone as a water-soluble resin solvent: 5 wt %
Propylene glycol as a medium-volatile humectant: 10 wt %
Pure water: balance The surface tension was 26 mN/m in all of the ink compositions 1 to 4.

Evaluation of Print

Prints were created by a printer shown in FIGS. 1 to 3 on various recording media, namely, glossy-type fine coated paper OK topcoat+ (trade name, produced by Oji Paper Co., Ltd.) used as printing paper, PET media cold laminate film PG-50L (trade name, produced by Lami Corporation Inc.), and PPC paper P (64 g/m$^2$, produced by Fuji Xerox Co., Ltd.) widely used as copy paper in offices, and evaluated.

A recording head mounted in an ink jet printer, PX-B500 (trade name, produced by Seiko Epson Corporation) was used as a recording head. The ink compositions 1 to 4 were charged in the recording head and the following were printed at an ejected ink weight of 30 nanograms per dot (ng/dot) and a resolution of 360 dot per inch (dpi):

(1) horizontal and vertical ruled lines formed by one black dot (2) solid images in cyan, magenta, and yellow formed at a print duty of 100%

(3) ruled lines in cyan, magenta, and black formed by three dots on a yellow solid image at a print duty of 100%

Next, in the platen 34 serving as a first drying unit, the temperature of the heater was varied to control the amount of ink components evaporated in the first drying unit. After printing, the recording medium was transported to the drying oven 52 serving as a second drying unit and evaporation of the ink components was further accelerated by blowing hot air onto the recording medium.

The resulting print was visually evaluated by five subjects according to the following standards and the evaluation was determined by the majority:

in Evaluation (1), A: no beading occurred and B: beading occurred in Evaluation (2), A: no nonuniformity in solid images observed and B: nonuniformity in solid images observed in Evaluation (3), A: no color bleeding occurred and B: color bleeding occurred The results are shown in FIGS. 4A and 4B, Tests 1 to 7.

Next, 10 wt % of propylene glycol serving as a medium-volatile humectant in the ink compositions 1 to 4 above was replaced by 10 wt % of glycerin, i.e., a low-volatile humectant having a boiling point of 290° C. to prepare a cyan ink composition 5, a magenta ink composition 6, an yellow ink composition 7, and a black ink composition 8.

The surface tension was 27 mN/m in all of the ink compositions 5 to 8.

Test 8 was conducted under the conditions shown in FIG. 5 using the ink compositions 5 to 8 instead of the ink compositions 1 to 4, respectively, and the evaluation was made as described above. The results are shown in FIG. 5.

Tests 1 to 7 in FIGS. 4A and 4B clearly show that when 50 wt % or more of ink adhered on the recording medium was evaporated in the first drying unit and then the remaining ink was further dried in the second drying unit downstream of the first drying unit in the feeding direction of the recording medium, high-quality images could be recorded at high speed by an ink jet technique on a recording medium, such as a glossy fine coated paper used as printing paper that has low ink absorbing property.

When 60 wt % or more of the ink adhering on the recording medium was evaporated in the first drying unit, high-quality images could be recorded at high speed by an ink jet technique on a recording medium, such as a PET medium, that has no ink absorbing property. Conversely, when the amount of ink evaporated in the first drying unit was smaller, beading or nonuniformity in solid images caused by aggregation of ink molecules occurred and color bleeding, i.e. mixing of color inks not sufficiently dried on the recording medium, occurred.

When 85 wt % or more of the ink adhering on the recording medium was evaporated in the first drying unit, high-quality images could be printed by an ink jet technique on a recording medium, such as PPC paper widely used as copy paper in general offices, having high ink-absorbing property or a recording medium, such as glossy fine coated paper used as printing paper, having low ink-absorbing property. However, when a recording medium that has no ink-absorbing property, such as a PET medium, was used, the amount of ink contributing to printing was small, the ruled line width in the head scanning direction became smaller, and white streaks occurred in solid images formed at a 100% duty. The subjects observed nonuniformity in solid images and it was difficult to record high-quality images by the ink jet technique.

When 90 wt % or more of the ink adhering on the recording medium was evaporated in the first drying unit, white streaks occurred in solid images formed at a 100% duty even on a recording medium having low ink-absorbing property, such as a glossy fine coated paper used as printing paper, and it was difficult to record high-quality images by the ink jet technique.

As apparent from FIG. 5, since glycerin, which is a low-volatile humectant having a boiling point of 290° C. was contained in the ink compositions, it took a relatively longer time for evaporating an adequate amount of ink and drying of the outermost surfaces of ink droplets was insufficient although an adequate amount of ink was evaporated in the first drying unit. This resulted in beading and nonuniformity in solid images caused by aggregation. Thus, it was difficult to record high-quality images by the ink jet technique.

In other words, according to an ink jet recording apparatus and a recording method using this apparatus according to this embodiment, high-quality images could be printed at high speed on a recording medium having little or no ink-absorbing property. Compared to a wide spread recording apparatus equipped with one heating unit near a recording head for accelerating drying of the ink and a recording method using this apparatus, heat for drying the ink can be efficiently applied to the recording medium. Thus, the amount of energy required for heating can be reduced as a whole.

What is claimed is:

1. A recording method comprising:
   transferring a recording medium to a recording unit, the recording unit includes a recording head and a medium-supporting unit,
   a first drying step of evaporating ink adhering on the recording medium, the ink being ejected from the recording head onto a surface of the recording medium, wherein a back side of the recording medium is supported on a medium supporting surface of the medium-supporting unit which faces the recording head,
   feeding the recording medium, which has been subjected to the first drying step, from the medium-supporting unit to a second drying unit located at a downstream side of the medium-supporting unit in a feeding direction of the recording medium, and
   a second drying step of drying the recording medium, which has been fed by the feeding, in the second drying unit;
   wherein the ink at least contains:
   (1) a colorant;
   (2) a resin;
   (3) at least one organic solvent having a boiling point of 100° C. or more and 250° C. or less;
   (4) a surfactant; and
   (5) water;
   wherein the recording head is located upward relative to a plane that includes the medium supporting surface and is an extension of the medium supporting surface,
   in the feeding, the recording medium is fed downward relative to the plane,
   the second drying step is carried out to the recording medium located downward relative to the plane.

2. The recording method according to claim 1, wherein the first drying step includes conducting heat through the medium-supporting unit to the back side of the recording medium.

3. The recording method according to claim 1, wherein the recording medium is intermittently fed.

4. The recording method according to claim 1, wherein the recording medium is a film material.

5. The recording method according to claim 1, wherein a temperature of the second drying step is higher than a temperature of the first drying step.

6. The recording method according to claim 1, wherein the ink at least contains a medium-volatile humectant of 2 to 15 wt %.

7. The recording method according to claim 1, wherein the ink at least contains a water-soluble penetration solvent of 1 to 8 wt %.

8. The recording method according to claim 1, wherein the ink at least contains water of 50 to 80 wt %.

9. The recording method according to claim 1, wherein the ink at least contains a water-soluble penetration solvent being at least one organic solvent selected from the group consisting of n-butanol, 1,2-hexanediol, 1,3-hexanediol, 1,2-heptanediol, 1,3-heptanediol, 1,2-octanediol, 1,3-octanediol, 1,2-pentanediol, triethylene glycol monobutyl ether, diethylene glycol monobutyl ether, diethylene glycol monopropyl ether, diethylene glycol monopentyl ether, and propylene glycol monobutyl ether.

10. The recording method according to claim 1, wherein the ink at least contains at least one organic solvent service as a water-soluble resin solvent of 2 to 10 wt %.

11. The recording method according to claim 1, wherein the ink does not contain glycerin.

12. The recording method according to claim 1, wherein the first drying step includes a thermal conductive technique.

13. The recording method according to claim 1, wherein the second drying step includes a convection technique including applying air to the recording medium, wherein the air is hot air.

14. The recording method according to claim 13, wherein a temperature of the applied air is in a range of 60° C. to 100° C.

15. The recording method according to claim 1, wherein the ink at least contains a medium-volatile humectant being at least selected from the group consisting of ethylene glycol, diethylene glycol, propylene glycol, dipropylene glycol, 1,3-propanediol, 1,4-butanediol, hexylene glycol, and 2,3-butanediol.

16. The recording method according to claim 1, wherein the medium-supporting unit maintains a fixed location throughout the recording method.

17. The recording method according to claim 1, wherein after the second drying step, the recording medium is taken up by a take-up roller.

18. The recording method according to claim 1, wherein the medium-supporting unit comprises a platen with a heating unit arranged inside the platen.

19. The recording method according to claim 1, wherein the recording medium transferred to the recording unit is fed from a rolled medium holder.

20. The recording method according to claim 1, wherein the recording medium is a rolled recording medium and is a plastic film.

21. The recording method according to claim 1, wherein the second drying unit is located downward relative to the plane.

22. The recording method according to claim 1, wherein the recording head is installed in a carriage, and while the ink is ejected from the recording head and adhered on the recording medium, the recording head moves relative to the recording medium.

* * * * *